(12) United States Patent
Morokawa et al.

(10) Patent No.: US 12,661,834 B2
(45) Date of Patent: Jun. 23, 2026

(54) MOLDING SYSTEM, MOLDING METHOD, AND PRODUCT MANUFACTURING METHOD

(71) Applicant: CANON KABUSHIKI KAISHA, Tokyo (JP)

(72) Inventors: Yuya Morokawa, Tochigi (JP); Shinichiro Koga, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 18/672,174

(22) Filed: May 23, 2024

(65) Prior Publication Data

US 2024/0424718 A1 Dec. 26, 2024

(30) Foreign Application Priority Data

Jun. 20, 2023 (JP) ................................. 2023-100835

(51) Int. Cl.
*B29C 43/02* (2006.01)
*B29C 43/58* (2006.01)

(52) U.S. Cl.
CPC ............ *B29C 43/58* (2013.01); *B29C 43/021* (2013.01)

(58) Field of Classification Search
None
See application file for complete search history.

(56) References Cited

U.S. PATENT DOCUMENTS

| | | | |
|---|---|---|---|
| 8,394,282 B2 | 3/2013 | Panga et al. | |
| 2010/0012622 A1* | 1/2010 | Panga ................... | G03F 7/0002 216/52 |
| 2019/0391483 A1* | 12/2019 | Ito ......................... | G03F 7/0002 |

FOREIGN PATENT DOCUMENTS

| | | | |
|---|---|---|---|
| CN | 109562902 A | 4/2019 | |
| JP | 2011529626 A | 12/2011 | |
| KR | 1020190032231 A | 3/2019 | |
| WO | WO-2020213571 A1 * | 10/2020 | .......... H10P 72/0448 |

OTHER PUBLICATIONS

Office Action issued in Korean Appln. No. 10-2024-0076079 mailed on Mar. 18, 2026.
Office Action issued in Taiwanese Appln. No. 113119986, dated on Apr. 9, 2026.

* cited by examiner

*Primary Examiner* — Mohammad M Ameen
(74) *Attorney, Agent, or Firm* — ROSSI, KIMMS & McDOWELL LLP

(57) ABSTRACT

A molding system includes: a composition applying unit configured to apply a composition on a substrate; a molding unit configured to perform a molding process by bringing a mold into contact with the composition; a transport unit configured to transport the substrate between the composition applying unit and the molding unit; a unit configured to calculate an expected value of an interval time from the applying of the composition to start of the contact; and a control unit configured to perform control such that a difference between an actual interval time and a target value of the interval time is less than a predetermined value by changing at least one of a timing of the applying, a transport waiting time, a transport time, and a contact waiting time if the difference between the expected value and the target value of the interval time is equal to or greater than the predetermined value.

15 Claims, 6 Drawing Sheets

MOLDING SYSTEM, MOLDING METHOD, AND PRODUCT MANUFACTURING METHOD

BACKGROUND OF THE INVENTION

Field of the Invention

The present disclosure relates to a molding system, a molding method, and a product manufacturing method.

Description of the Related Art

As requests for miniaturizing semiconductor devices have increased, fine processing techniques for molding and curing uncured compositions on substrates and forming patterns of the compositions on substrates have attracted attentions in addition to photolithographic techniques of the related arts. Such techniques are called imprinting techniques and are used for imprinting systems in this case since minute patterns with several nanometers can be formed on substrates.

As one of the imprinting techniques, for example, there is a photocuring method. An imprinting apparatus adopting a photocuring method forms a pattern on a substrate by molding a curable composition supplied to a shot region on the substrate, radiating light, curing the composition, and separating the mold from the cured composition.

A flattening system that forms a flattened surface on a substrate using an imprinting technique has been proposed. For example, Published Japanese Translation No. 2011-529626 of the PCT International Publication discloses a technique for flattening a composition on a substrate by dropping a composition as droplets based on a step difference of the substrate and curing the composition with the flat surface of the mold coming into contact with the dropped composition.

In such a flattening system, since a composition is dropped from a unit separate from a unit that performs a flattening process, a time interval such as a substrate transport time occurs from the dropping of the composition which is droplets to coming into contact with a mold. Accordingly, there is a possibility of the composition being volatilized meanwhiles and an amount decreasing during that time.

When the composition is brought into contact with the mold in a state in which there is less than an appropriate amount of composition on the substrate due to the volatilization of the composition, the thickness of a flattened film formed by curing the composition may lack or be deficient in some cases. When the mold is brought into contact with the composition in a state in which the amount of composition on the substrate is equal to or greater than the appropriate amount, the flattened film obtained by curing the composition may have a thickness equal to or greater than an appropriate thickness in some cases.

Further, there are processes (etching or the like) during the process of manufacturing a semiconductor device that is a final product, some steps are affected by the thickness of the flattened film obtained by curing the composition. An important task is to adjust an amount of the composition appropriately in order to stabilize these operations. There is also such a problem similarly in an imprinting system.

SUMMARY OF THE INVENTION

According to an aspect of the present invention, a molding system includes: a composition applying unit configured to apply a composition on a substrate; a molding unit configured to perform a molding process by bringing a mold into contact with the composition; a transport unit configured to transport the substrate between the composition applying unit and the molding unit; a calculation unit configured to calculate an expected value of an interval time from the applying of the composition to start of the contact; and a control unit configured to perform control such that a difference between an actual interval time and a target value of the interval time is less than a predetermined value by changing at least one of a timing of the applying, a transport waiting time, a transport time, and a contact waiting time when the difference between the expected value and the target value of the interval time is equal to or greater than the predetermined value.

Further features of the present disclosure will become apparent from the following description of embodiments with reference to the attached drawings.

DESCRIPTION OF THE EMBODIMENTS

Hereinafter, with reference to the accompanying drawings, favorable modes of the present disclosure will be described using Embodiments. In each diagram, the same reference signs are applied to the same members or elements, and duplicate description will be omitted or simplified.

FIGS. 1A to 1D are diagrams illustrating a flattening process in a flattening system that is a molding system according to an embodiment of the present invention. The flattening process according to the present embodiment is a process of dropping a composition to the entire surface of the substrate, bringing the composition into contact with the mold, and flattening the composition. However, the flattening process includes a process of bringing the composition on a partial region of the substrate into contact with the mold and flattening the composition.

The molding system according to the embodiment of the present invention is not limited to a flattening system and also includes an imprinting system that performs an imprinting process. Molding (molding unit) for performing molding by bringing a mold into contact with a composition includes molding (molding unit) for imprinting.

Figure 1A:
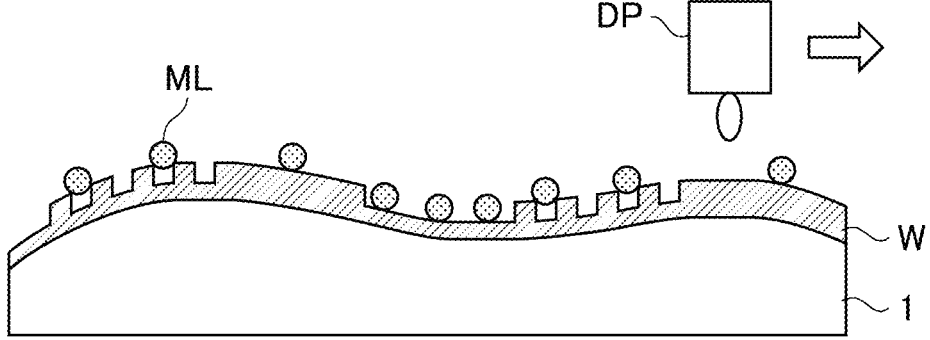
FIGS. 1A to 1D are diagrams illustrating a flattening process in a flattening system that is a molding system according to an embodiment of the present invention.

First, as illustrated in FIG. 1A, a composition ML is disposed on a substrate 1 on which a base pattern W is formed (composition disposing). Specifically, the composition ML used as a flattening material is dropped as droplets to the substrate 1 by a liquid droplet supply unit DP such as a dispenser. Here, a distribution of the composition ML disposed by the liquid droplet supply unit DP may be adjusted in accordance with a shape of the base pattern W formed on the surface of the substrate 1.

Figure 1B:
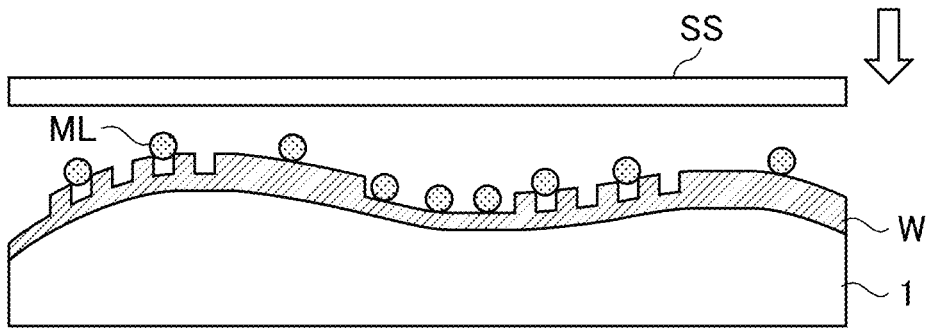

Subsequently, as illustrated in FIG. 1B, a mold super straight (also referred to as an SS) including a flattened portion with dimensions that are the same as the substrate 1 or greater than the substrate 1 on the substrate 1 is brought into contact with the composition ML of the substrate 1 (contacting). Accordingly, the composition ML is spread to form a film shape.

Figure 1C:
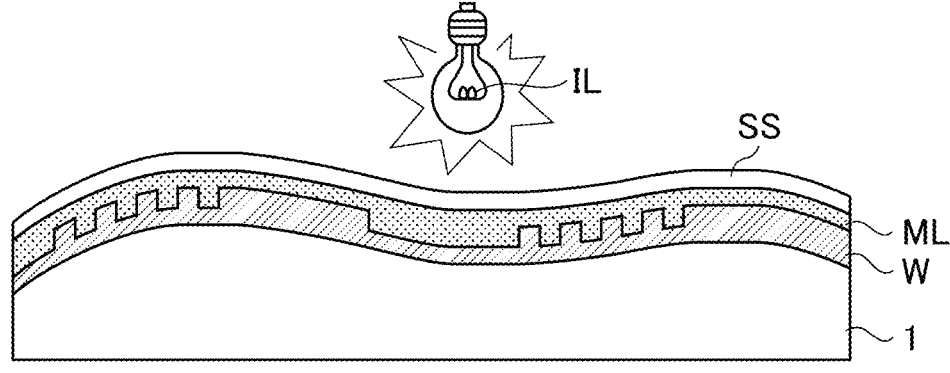

Subsequently, as illustrated in FIG. 1C, energy for curing the composition ML is given from an illuminator IL to the composition ML with the mold SS brought into contact with the composition ML on the substrate 1 to cure the composition ML (curing).

In the curing, it is necessary to bring all the flattened portion of the mold SS into contact with the composition ML on the substrate and model the flattened portion of the mold SS to the shape of the surface of the substrate 1. As the curing energy used in the curing, light such as ultraviolet light radiated from an illuminance (light radiation unit) (not illustrated) can be used.

As will be described in detail, as an example of a case in which light is used as the curing energy, there is a method of irradiating the composition ML with light from the illuminator IL (curing unit) via the mold SS using a material that has a photocuring property for the composition ML and using a material through which light from the illuminator is transmitted for the mold SS and curing the composition ML.

Figure 1D:
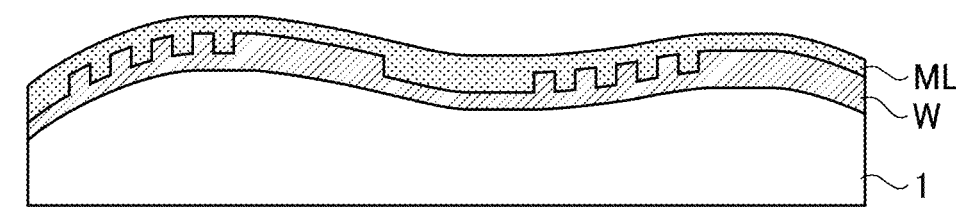

Subsequently, as illustrated in FIG. 1D, the mold SS is separated from the cured composition ML on the substrate 1 (separating). Accordingly, a flattened film formed of the cured composition ML remains on the substrate 1. That is, by using the mold SS, it is possible to form a flattened layer (flatted film) having a locally flattened surface by a cured object of the composition ML.

As the foregoing flattening method, there is an example in which a flattened layer is formed at once on the entire region of the substrate 1 by using the mold SS that has an area covering the entire region of a plurality of shot regions of the substrate 1, but the present invention is not limited thereto. In the following description, description of the base pattern W on the substrate 1 will be omitted, but it is assumed that the base pattern W is provided between the substrate 1 and the composition ML in manufacturing. However, the present invention is not limited thereto.

Figure 2:
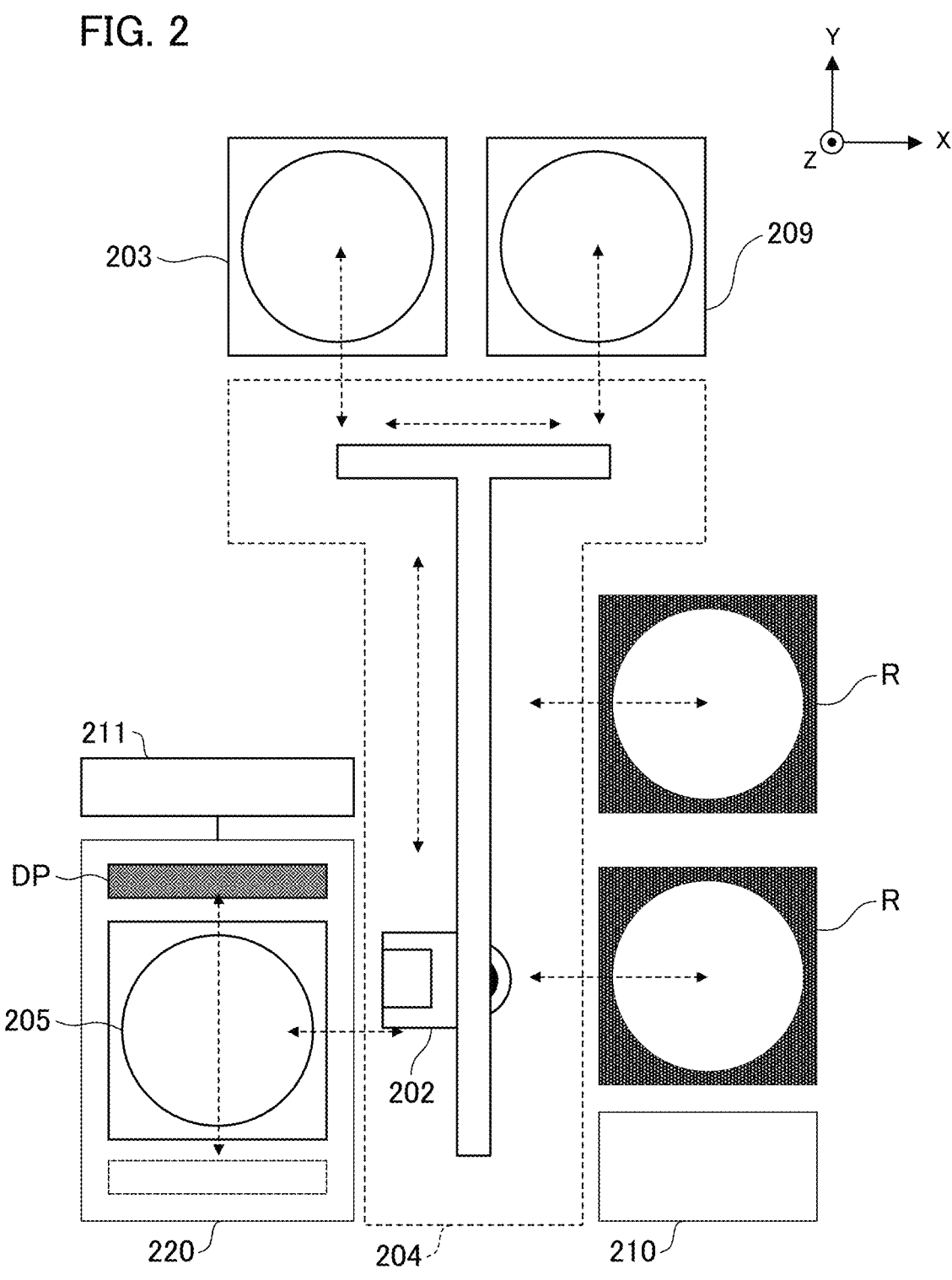
FIG. 2 is a diagram illustrating a configuration example of the flattening system including a flattening apparatus according to the embodiment of the present invention.

FIG. 2 is a diagram illustrating a configuration example of the flattening system including a flattening apparatus according to the embodiment of the present invention. In the present embodiment, an XYZ coordinate system that has a vertical direction as the Z axis is used to indicate a direction. The flattening system 100 includes one or a plurality of flattening apparatuses (film forming apparatuses) R. In FIG. 2, two flattening apparatuses are illustrated.

The flattening apparatus R performs a flattening process that includes the contacting for bringing the composition ML on the substrate 1 described with reference to FIG. 1 into contact with the mold SS, the curing for curing the composition ML, and the separating for separating the mold SS from the cured object of the composition ML.

In the flattening system 100 of FIG. 2, a substrate transport container 203, a substrate transport mechanism 204, a preparation station 220, a heat processing unit 209, a control unit 210, and the like are provided. As the substrate transport mechanism 204, for example, an equipment front end module (EFEM) can be used.

The substrate transport mechanism 204 moves (transports) the substrate 1 between the substrate transport container 203, the heat processing unit 209, and the preparation station 220. As the substrate transport container 203, a front-opening unified pod (FOUP) can be used.

The substrate 1 stored in the substrate transport container 203 is transported to the preparation station 220 by the substrate transport mechanism 204. In the preparation station 220, an alignment mechanism 205 and the liquid droplet supply unit (dispenser) DP are provided. The liquid droplet supply unit DP is disposed above the Z axis of the alignment mechanism 205.

The alignment mechanism 205 measures rotation of the substrate 1 transported from the substrate transport container 203 by the substrate transport mechanism 204 around the Z axis and adjusts the rotation of the substrate 1 around the Z axis to a target angle based on a measurement result.

The rotation of the substrate 1 around the Z axis can be measured, for example, by detecting a notch of the substrate 1. The alignment mechanism 205 can measure a central position in the XY direction in addition to a rotational angle of the substrate 1. The alignment mechanism 205 can adjust a position of the substrate 1 based on the measurement result of the measured position of the substrate 1.

A position of a transport hand 202 in delivery of the substrate 1 from the alignment mechanism 205 to the transport hand 202 of the substrate transport mechanism 204 may be adjusted based on the measurement result of the position of the substrate 1. The preparation station 220 may have a function of adjusting a temperature of the substrate 1.

The liquid droplet supply unit DP sequentially disposes the composition ML onto the substrate 1, as described in FIG. 1A. The liquid droplet supply unit DP is connected to a circulation unit 211 that circulates the composition ML. The circulation unit 211 performs temperature adjustment or the like of the composition ML to maintain physical properties thereof and circulates the composition ML to maintain a wettability property of an ejection surface of the liquid droplet supply unit DP or maintain an internal pressure of the liquid droplet supply unit DP at an internal pressure.

A circulation path of the composition ML can be set to a path starting from a storage tank provided in the circulation unit 211 and returning to the storage tank via the ejection surface of the liquid droplet supply unit DP. The liquid droplet supply unit DP may be configured as a spin coater or a slit coater.

The substrate 1 is transported from the substrate transport container 203 to the preparation station 220 by the substrate transport mechanism 204. In the preparation station 220, a process of disposing the composition ML on the substrate 1 is performed in addition to the process of adjusting the rotation and the position of the substrate 1 around the Z axis.

In one example, the composition ML can be disposed on the substrate 1 by ejecting the composition ML while moving the liquid droplet supply unit DP along the XY plane in a state in which the position of the substrate 1 retained by the alignment mechanism 205 is fixed.

In another example, the alignment mechanism 205 includes a substrate transport unit. The composition ML can be disposed on the substrate 1 by ejecting the composition ML from the liquid droplet supply unit DP while the substrate transport unit transports the substrate 1 along an XY plane.

Alternatively, the composition ML may be disposed on the substrate 1 while the substrate transport unit transports the substrate 1 along the XY plane and the liquid droplet supply unit DP is also moved along the XY plane. Alternatively, after the alignment mechanism 205 measures rotation and a position of the substrate 1 around the z axis, the liquid droplet supply unit DP may dispose the composition ML on the substrate 1 in a state in which the transport hand 202 of the substrate transport mechanism 204 retains the substrate 1.

The heat processing unit 209 is used to perform a baking process (heating process) of the substrate 1 or to perform a cooling process. The heat processing unit 209 may be configured as a part of the flattening apparatus R or may be configured as an apparatus different from the flattening apparatus R.

The control unit 210 contains a CPU serving as a computer that controls each unit of the flattening system 100 including the flattening apparatus R to perform a flattening process based on a computer program stored in a memory serving as a storage medium. That is, the control unit 210 controls the entire flattening system 100 by controlling the flattening apparatus R, the substrate transport mechanism 204, the preparation station 220, and the heat processing unit 209.

The control unit 210 is configured by, for example, a programmable logic device (PLD) such as a field programmable gate array (FPGA), or an application specific integrated circuit (ASIC), a general-purpose or dedicated computer in which a program is embedded, or a combination of all or some thereof.

Each flattening apparatus R included in the flattening system 100 may include a control unit and may be configured such that the control unit in each flattening apparatus R controls the flattening process. The flattening apparatus R performs the flattening process described in FIGS. 1B to 1D.

If the plurality of flattening apparatuses R in the flattening system 100 are disposed, the plurality of flattening apparatuses R may be disposed along the XY plane or may be disposed by being stacked along the Z axis.

In the present embodiment, an example in which the flattening apparatus R continuously performs the contacting, the curing, and the separating will be described, but the flattening apparatus R may be divided into an apparatus that performs the contacting, an apparatus that performs the curing, and an apparatus that performs the separating.

As the composition ML, a curable composition that is cured by giving curing energy can be used. As the curing energy, an electromagnetic wave, heat, or the like can be used. As the electromagnetic waves, for example, light such as infrared light, visible light, or ultraviolet light can be selected from waveforms in a range equal to or greater than 10 nm and equal to or less than 1 mm.

The curing composition is a composition that is cured through radiation of light or heating. A photocurable composition that is cured by radiation of light may contain at least a polymerizable compound and a photoinitiator and may contain a non-polymerizable compound or a solvent as necessary. The non-polymerizable compound is at least one type selected from a group consisting of a sensitizer, a hydrogen donor, an internally added releasing agent, a surfactant, an oxidant inhibitor, and a polymer component.

The composition ML may be disposed on the substrate 1 in a liquid droplet shape, or an island shape or a membrane shape formed by connecting a plurality of liquid droplets by the liquid droplet supply unit DP (liquid ejecting head). As such a viscosity (viscosity at 25° C.) of the composition ML, for example, a viscosity equal to or greater than 1 mPa·s or equal to or less than 100 mPa·s can be used.

In a method using heat as the curing energy, the flattened film can be formed by heating a thermoplastic resin to a temperature equal to or greater than a glass transition temperature, pressing a mold against the substrate via the resin with high fluidity, performing cooling, and then separating the mold from the resin.

In the following present embodiment, an example in which a photocurable material is used as the composition ML using ultraviolet light as curing energy will be described.

As the substrate 1, a silicon wafer is a representative material, but the present invention is not limited thereto. As the substrate 1, any material can be selected from a semiconductor device substrate such as aluminum, a titanium-tungsten alloy, an aluminum-silicon alloy, an aluminum-copper-silicon alloy, a silicon oxide, or a silicon nitride, quartz glass, a ceramic, a metal, a resin, and the like.

As the substrate 1, a substrate of which adhesion with a curable composition is improved by forming an adhesive layer through surface processing such as silane coupling processing, silazane processing, or organic thin film forming may be used. The substrate 1 generally has a circular shape with a diameter of 300 mm, but the present invention is not limited thereto.

As the mold SS, a mold formed of a material with optical transparency is used in consideration of light radiating. As quality of a material of the mold SS, for example, a light transparent resin such as glass, quartz, polymethyl methacrylate (PMMA), a polycarbonate resin, a transparent metal deposition film, a flexible film such as polydimethylsiloxane, a photocurable film, a metal film, or the like is preferable.

The mold SS preferably has a circular shape with a diameter greater than 300 mm and less than 500 mm, but the present invention is not limited thereto. The thickness of the mold SS is preferably equal to or greater than 0.25 mm and less than 2 mm, but the present invention is not limited thereto.

The above-described substrate transport mechanism 204 can also function as a mold transport mechanism that transports the mold SS to the flattening apparatus R. The transport hand 202 of the substrate transport mechanism 204 extracts the mold SS from a mold transport container (not illustrated) and transports the mold SS to the flattening apparatus R.

In semiconductor forming, the flattening layer forming (film forming) illustrated in FIGS. 1A to 1D may be performed on one substrate 1 a plurality of times. In semiconductor device manufacturing, there are many processes of applying high heat to the substrate 1 in plasma etching, coating, cleaning, ion implanting, and the like.

Even after the substrate 1 is flattened once, the composition ML is contracted by the applied heat or distortion in a subsequent step is released, and thus there is a possibility of flatness of the substrate 1 deteriorating again. It is not efficient to perform a flattening process on the substrate 1 whenever the flatness of the substrate 1 deteriorates.

Accordingly, in some cases, it is advantageous that a heat cycle is performed immediately after the flattened film is formed, the composition ML of the substrate 1 is contracted in advance, distortion is released, and then transport to a subsequent step is quickly performed. The above-described heat processing unit 209 is useful for such a purpose.

The heat processing unit 209 can also be configured such that a plurality of substrates can be processed at a time. For example, the heat processing unit 209 can pile the substrates 1 in the vertical direction at a given interval and perform baking and cooling in units of given quantities in accordance with a batch scheme. For example, the substrate 1 returned to the substrate transport mechanism 204 can be transported to the heat processing unit 209, and baking and quick cooling can be performed on the plurality of substrates 1 at about 250 degrees to 400 degrees.

Figure 3:
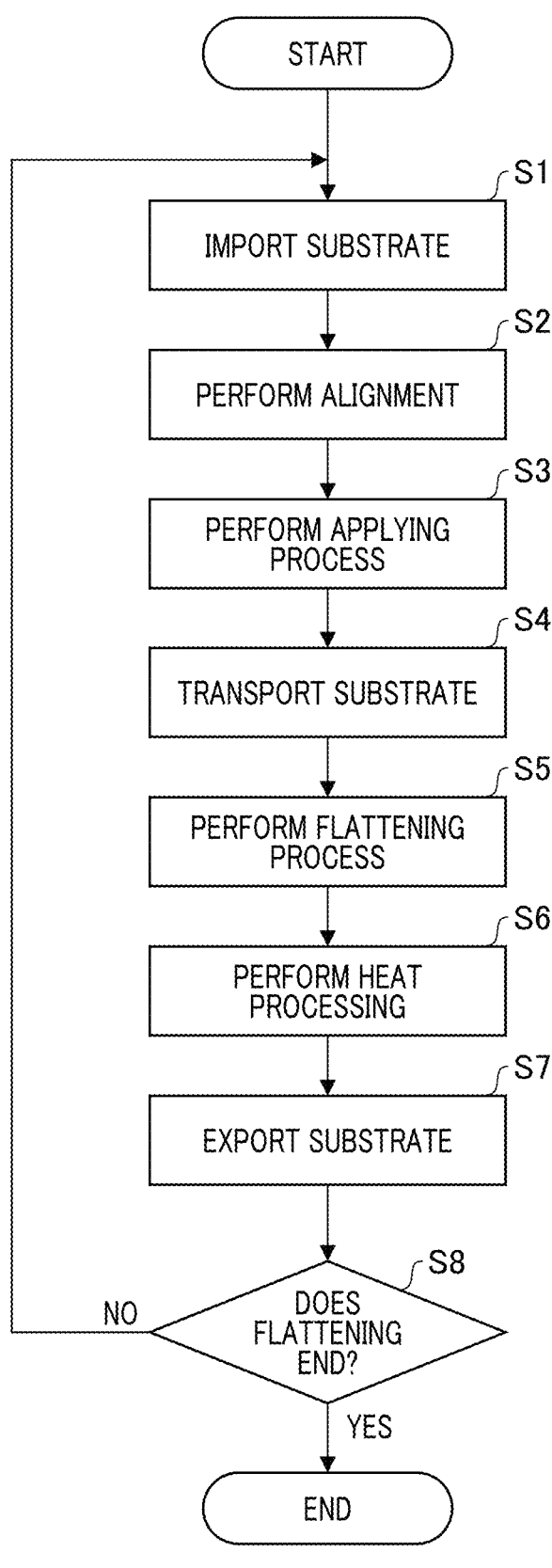
FIG. 3 is a flowchart illustrating a processing example of a flattening method in the flattening system according to the embodiment of the present invention.

FIG. 3 is a flowchart illustrating a processing example of a flattening method in the flattening system according to the embodiment of the present invention. When the CPU or the like serving as a computer in the control unit 210 executes a computer program stored in a memory, operations of steps of the flowchart of FIG. 3 are sequentially performed. The flattening process is performed by causing the control unit 210 to control each unit of the flattening system 100 overall as described above, as described above.

In step S1 of FIG. 3, the control unit 210 causes the substrate transport mechanism 204 to import the substrate 1 into the flattening system 100.

Subsequently, in step S2, the control unit 210 causes the alignment mechanism 205 to measure a rotation and a central position of the substrate 1 around the z axis and adjusts the rotation and the position of the substrate 1 around the Z axis to a target angle based on a measurement result.

Subsequently, in step S3, the control unit 210 applies the composition to the substrate 1 by causing the liquid droplet supply unit DP to drop a liquid droplet of the composition ML to the substrate 1. Here, step S3 functions as composition applying (composition applying unit) of applying the composition to the substrate. At this time, the composition is supplied while adjusting an amount of applied composition based on step difference information in accordance with a pattern or the like configured in advance on the substrate 1.

When an appropriate amount of composition is applied to the substrate, the process proceeds to step S4 and the control unit 210 performs transporting for causing the substrate transport mechanism 204 to import the substrate 1 to the predetermined flattening apparatus R. Here, step S4 functions as transporting (transport unit) for transporting the substrate between the composition applying and the molding.

Then, in step S5, the flattening apparatus R performs the flattening process described in FIGS. 1B to 1D. Here, step S5 functions as the molding (molding unit) for performing a molding process by bringing the mold into contact with the composition.

Subsequently, in step S6, the control unit 210 performs a cooling process after the substrate transport mechanism 204 imports the substrate 1 to the heat processing unit 209 and the heat processing unit 209 performs a baking process (heating process) of the substrate.

Subsequently, in step S7, the control unit 210 causes the substrate transport mechanism 204 to export the substrate 1 into the flattening system 100 by causing the flattening system 100 to complete the flattening process on one substrate, and returns the substrate 1 to the substrate transport container 203 or the like.

Thereafter, the process proceeds to step S8. It is determined whether the substrate scheduled to be processed remains, that is, whether the flattening process ends. When the substrate scheduled to be processed remains, the process starts again from step S1. If it is determined in step S8 that flattening process ends, the flow of FIG. 3 ends.

Here, as described above, when the composition is brought into contact with the mold in a state in which the composition on the substrate does not reach an appropriate amount due to the volatilization of the composition, the thickness of a flattened film formed by curing composition may lack or be deficient in some cases. Thus, a defect occurs in the flattening on the substate in some cases. When the mold is brought into contact with the composition in the state in which the composition on the substrate is equal to or greater than the appropriate amount, appropriate flattening in which a flattened film obtained by curing the composition has a thickness equal to or greater than an appropriate thickness cannot be performed in some cases.

Further, as a process (etching or the like) while a semiconductor device that is a final product is manufactured, there is a process influenced by the thickness of the flattened film obtained by curing the composition ML. An object of the flattened film is to form a flattened surface on the substate. To stabilize subsequent processes, the thickness of the film is required to be stable between a series of substrates.

In the above-described flattening apparatus and flattening method, as a factor influencing the thickness of the flattened film, there is an amount of composition ML applied to the substrate. An amount of composition ML applied in the preparation station is controlled by the liquid droplet supply unit and an instruction value to the liquid droplet supply unit, and thus is substantially a constant amount.

However, if a material with high volatility is used as the composition ML, a volatile amount from applying in the preparation station to contact of the substate 1 and the mold SS by the flattening apparatus influences an amount of cured composition ML.

Figure 4:
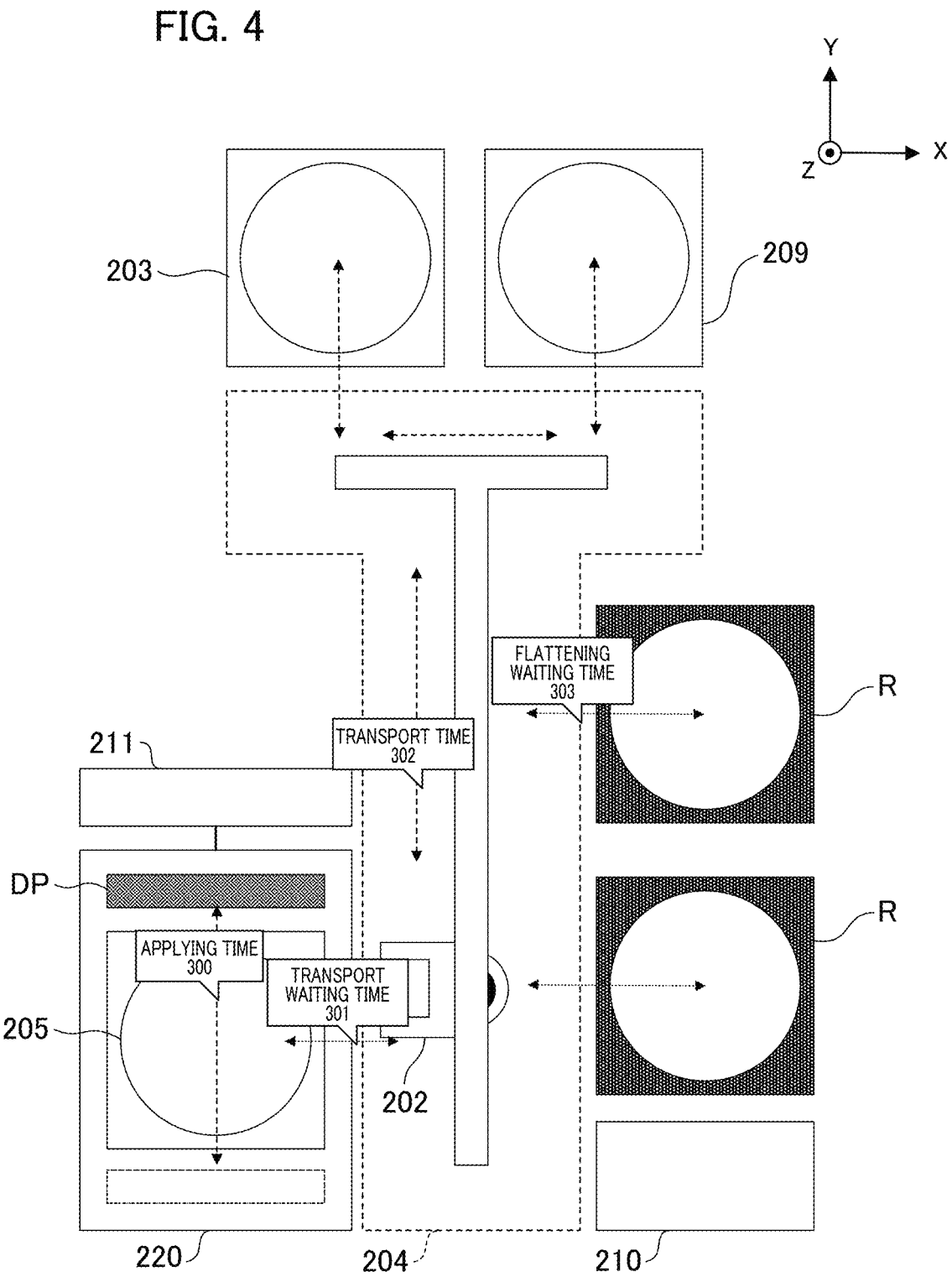
FIG. 4 is a diagram schematically illustrating an interval according to the present embodiment.

Thus, in the above-described flattening apparatus, an amount of cured composition ML is influenced by the following processing time (interval) schematically illustrated in FIG. 4. FIG. 4 is a diagram schematically illustrating an interval according to the present embodiment. In the present embodiment, a sum of the following a) to d) is referred to as an interval.

a) Transport Waiting Time 301

A transport waiting time 301 is a time until delivery from the preparation station 220 to the substrate transport mechanism 204 after the composition ML is applied to the substate by the preparation station 220. If the substrate transport mechanism 204 is being used for another substrate, the transport waiting time 201 also includes a waiting time of the substrate transport mechanism 204.

b) Transport Time 302

The transport time 302 is a time taken to transport the substate by the substrate transport mechanism 204 from a front of the preparation station 220 to a front of the predetermined flattening apparatus R.

c) Flattening Waiting Time 303

The flattening waiting time 303 is a time taken for the flattening apparatus R to receive the substrate and start the contacting and includes a time taken to deliver the substrate from the substrate transport mechanism 204 to the flattening apparatus R and a time taken until the flattening apparatus R starts the contacting process. Further, when the flattening apparatus R is being used, a waiting time of the flattening apparatus R is also included.

d) Applying Time 300

The applying time 300 is a time taken to apply the composition ML to the substate in the preparation station 220. As described above, a sum of the times a) to d) including the applying time 300 is also referred to as an interval in the present embodiment.

The substrate transport mechanism 204 transports the substrate from the preparation station 220 to the flattening apparatus R and is also used for other purposes. For example, the substrate transport mechanism 204 is also used to transport the substrate which the flattening process ends to the heat processing unit 209. Therefore, if the substrate transport mechanism 204 is used for other substrates processed in parallel in the flattening system, it is necessary to wait until the substrate transport mechanism 204 can be used.

In general, a time necessary for the flattening process in the flattening apparatus R is longer than a time in which the composition ML is applied in the preparation station 220. Accordingly, until the flattening process on a preceding substrate ends and the flattening apparatus R or the substrate transport mechanism 204 can be used, the substate to which the composition ML is applied in the preparation station 220 has to be awaited in some cases.

In addition, in the flattening apparatus R, a time in which the flattening apparatus R cannot temporarily be used arises for a periodic maintenance operation in some cases, and thus waiting is necessary similarly. Further, if the flattening system includes a plurality of flattening apparatuses R in order to shorten the waiting time, a timing at which the substrate to which the composition ML is applied is exported to the flattening apparatus R becomes more complicated.

In this way, the thickness of the flattened film influencing a process during manufacturing of a semiconductor device that is a final product is likely to be changed in accordance with a state of the flattening system.

Accordingly, in the present embodiment, to stabilize the thickness of the flattened film between the substrates and stabilize a manufacturing course of a semiconductor device that is a final product, an operation of the flattening system is controlled such that volatilization of the composition is constant between the substrates.

Specifically, a target interval that is an aiming interval (a time from start of applying to start of the contacting) is determined for each flattening process performed in advance under the same condition (for example, a flattening process in manufacturing of the same layer of the same semiconductor device).

Subsequently, for example, before the composition ML starts to be applied in the flattening process, an expected interval that is an expected value of the interval is calculated. Finally, by comparing the target interval with the expected interval, an applying start timing of the composition ML or a start time of the contacting is controlled. The target interval is determined to an implementable and short time from a result value such as a past processing time.

A specific order of target interval determination performed in advance and control of an applying start timing or a start timing of the contacting performed before the start of the applying of the composition ML in each substrate processing will be described below.

First, a target interval determining method performed in advance will be described. As described above, the target interval is a target time taken from the start of the applying to the start of the contacting and determined for each same flattening process. The target interval is determined to an implementable and short time from a result value such as a past processing time.

The target interval is determined, for example, at a time at which a processing condition of the flattening process is set. The processing condition of the flattening process is referred to as a recipe or the like. An amount or disposition of the applied composition ML (hereinafter referred to as a drop recipe), a time in which energy is given to cure the composition ML, or the like is designated. Specifically, the target interval is calculated as a total sum of times of the following e) to h).

e) Applying Time 300

The applying time of the composition ML can be calculated from the amount or disposition of the applied composition ML and an operation time of the liquid droplet supply unit DP necessary to apply the composition ML. Therefore, the applying time 300 taken to apply the composition in a flattening process that is a target is calculated from a set value of the amount or disposition of the composition ML and a result value (statistical value) of an operation time of the liquid droplet supply unit DP.

f) Transport Waiting Time 301

The transport waiting time 301 is a time in which the substrate transport mechanism 204 can be used and an operation time of the transport hand 202 or the like for delivery from the preparation station 220 to the substrate transport mechanism 204.

Here, a time until the substrate transport mechanism 204 can be used is not included in the target interval since the time is not known in the calculation of the target interval. An operation time for delivery from the preparation station 220 to the substrate transport mechanism 204 is calculated from a past result value (statistical value).

g) Transport Time 302

The transport time 302 is a time in which the substrate transport mechanism 204 transports the substate from a front of the preparation station to a front of the flattening apparatus R and is calculated from a result value (statistical value) of a past operation time in a flattening system that is a target.

Here, if the plurality of flattening apparatuses R are included in the flattening system, a distance or a transport time from the preparation station 220 to the flattening apparatus R differs depending on the flattening apparatus R to be used.

Therefore, for example, when the flattening apparatus R of which a distance is short is used using, as a transport time, an operation time when the flattening apparatus R of which a distance from the preparation station 220 is longer is used, for example, an operation time of feeding a waiting time is adjusted.

h) Flattening Waiting Time 303

The flattening waiting time 303 is a total sum of a time in which the substrate is delivered from the substrate transport mechanism 204 to the flattening apparatus R and a time taken until the flattening apparatus R starts a contacting process, and is calculated from a result value (statistical value) of a past operation time. The flattening waiting time also includes a waiting time of the flattening apparatus R if the flattening apparatus R is being used, but is not included in the calculation of the target interval.

Next, in the present embodiment, a specific order of control of a start timing performed before the start of the applying of the composition ML in each substrate processing (that is, an applying start timing or a contacting start timing) will be described.

In the present embodiment, for example, a volatile amount of composition ML is controlled by performing a process of determining the applying start timing or the contacting start timing before the composition ML in each substrate processing is applied.

Figure 5:
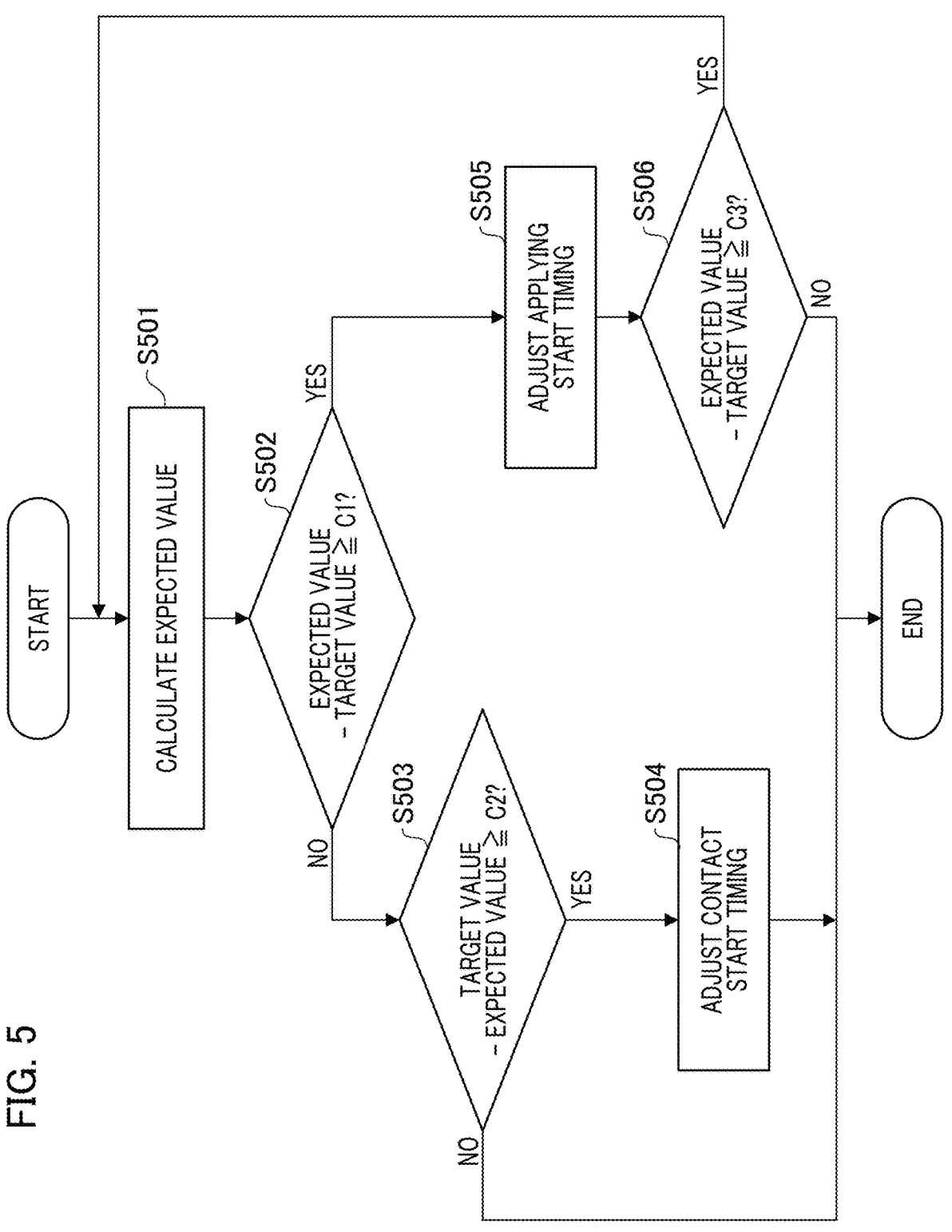
FIG. 5 is a flowchart illustrating a processing example in which an applying start timing and a contacting start timing in steps S3 and S4 of FIG. 3 are determined.

FIG. 5 is a flowchart illustrating a processing example in which an applying start timing and a contacting process start timing in steps S3 and S4 of FIG. 3 are determined. When the CPU or the like serving as a computer in the control unit 210 executes a computer program stored in a memory, operations of steps of the flowchart of FIG. 5 are sequentially performed.

First, in step S501, an expected interval (expected value) is calculated. As the expected interval (expected value), a time in a current flattening system is expected for times e) to h) of the same items as those of the target interval.

Specifically, a total sum of the following times e') to h') is calculated as the expected interval (expected value). Here, step S501 functions as calculating (calculation unit) of calculating an expected value of an interval that is a time from applying of the composition to start of the contact earlier than start of applying of the composition to the substrate.

e') Applying Time 300

An applying time of the composition ML is calculated from the amount or disposition of the applied composition ML and a latest operation time of the liquid droplet supply unit DP necessary to apply the composition ML. Further, if a waiting time until start of the applying of the composition ML is necessary as in a case in which the liquid droplet supply unit DP is calibrated, the waiting time is subtracted. That is, an applying start timing is advanced in consideration of the waiting time.

f) Transport Waiting Time 301

The transport waiting time 301 is calculated by a sum of a time in which the substrate transport mechanism 204 can be used and the latest operation time of the transport hand 202 or the like for delivery from the preparation station 220 to the substrate transport mechanism 204.

If an operation schedule of the flattening system is determined in advance, a waiting time until the substrate transport mechanism 204 can be used is obtained by adding, to the transport waiting time 301, a waiting time until the substrate transport mechanism 204 can be used with reference to the operation schedule. That is, an expected value of the transport waiting time is calculated based on the operation schedule of the transport unit.

g') Transport Time 302

As the transport time 302, time in which the substrate transport mechanism 204 transports the substate from the front of the preparation station 220 to the front of the flattening apparatus R is calculated from the latest operation time. Here, if the plurality of flattening apparatuses R are included in the flattening system, a time in which the substrate is transported based on a distance from the preparation station 220 to the used flattening apparatus R is calculated. That is, the expected value of the transport time is calculated based on the position of the molding unit.

h') Flattening Waiting Time 303

The flattening waiting time 303 is a total sum of a time in which the substrate is delivered from the substrate transport mechanism 204 to the flattening apparatus R and a time taken until the flattening apparatus R starts a contacting process, and is calculated from a latest operation time. If a waiting time is necessary to use the flattening apparatus, the waiting time is also added. That is, an expected value of a flattening waiting time is calculated based on an operation time immediately before the molding unit.

In this way, an interval at the target value or the expected value is calculated based on at least one of the applying time, the transport waiting time, the transport time, and the contact waiting time. An applying time of the composition ML that is at least one of the target value and the expected value is calculated based on at least one of the amount and disposition of the applied composition and a result value of the operation time of the liquid droplet supply unit. The target value is calculated based on a past operation result.

Subsequently, in step S502, based on a target interval (target value) and an expected interval (expected value), it is determined whether the expected value−the target value≥a first predetermined value C1. If a difference between the expected value and the target value is equal to or greater than the first predetermined value C1 (Yes in step S502), the process proceeds to step S505. In the case of No in step S502, the process proceeds to step S503.

In step S503, it is determined whether the target value−the expected value≥a second predetermined value C2. Here, the second predetermined value C2 is a value different from the first predetermined value C1. In the case of No in step S503, the flow of FIG. 5 ends.

Conversely, in the case of Yes in step S503, the process proceeds to step S504, a contact start time is adjusted, and a contact start timing is delayed. That is, if the target value is greater than the expected value by the second predetermined value C2 in step S503, the start of the contact in the flattening apparatus R is delayed in step S504.

In step S505, the applying start timing is delayed by adjusting the applying start timing. That is, the start of the applying of the composition ML is delayed. Thereafter, in step S506, it is determined whether the expected value−the target value≥a third predetermined value C3. Here, it is assumed that C3>C1. In the case of Yes in step S506, the process returns to step S501. In the case of No in step S506, the flow of FIG. 5 ends.

Figure 6A:
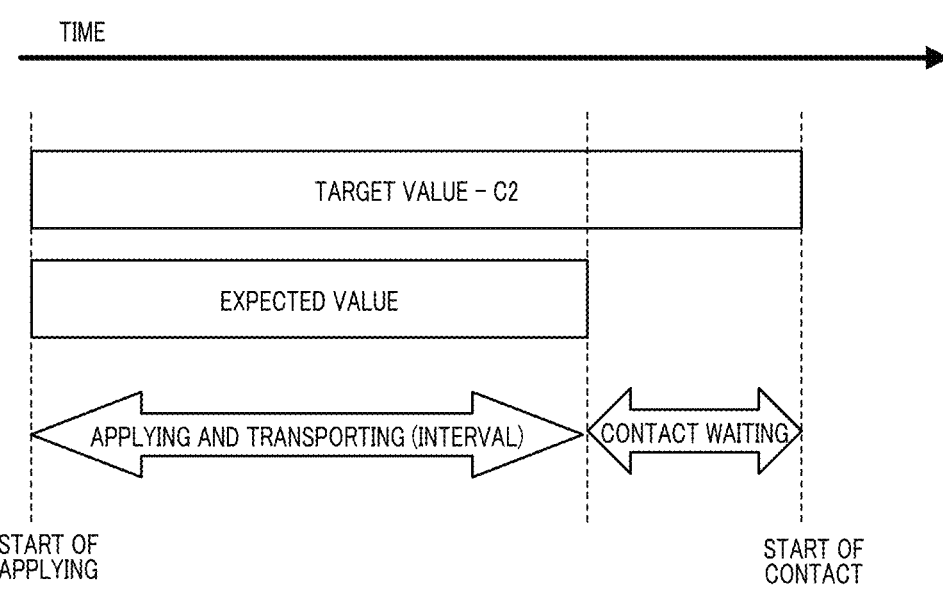
FIGS. 6A and 6B are diagrams schematically illustrating a control example from applying of a composition to start of the contact according to the present embodiment.
Figure 6B:
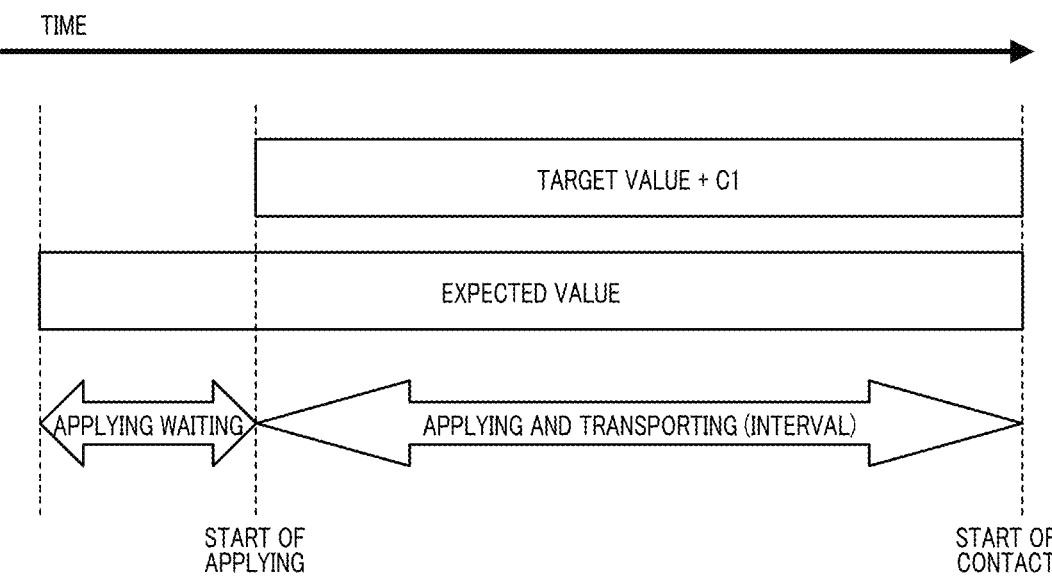

FIGS. 6A and 6B are diagrams schematically illustrating a control example from applying of a composition to the start of the contact according to the present embodiment. FIG. 6A is a diagram illustrating steps S503 and S504.

In the case illustrated in FIG. 6A, after the composition ML is applied, a contactable state with the composition ML in the flattening apparatus R is achieved after a time of the expected value, but a time after the applying does not reach a time of (the target value−the second predetermined value C2).

Therefore, execution of the contacting in the flattening apparatus R is awaited for a time until (the target value−the second predetermined value C2) is achieved. Accordingly, after the applying starts, the contacting in the flattening apparatus R is started at a timing at which the time of (the target value−the second predetermined value C2) has passed.

On the other hand, FIG. 6B is a diagram illustrating a case in which the expected value is longer than (the target value+the first predetermined value C1). In this case, when the applying starts immediately, a time of (the target value−the first predetermined value C1) is exceeded until a time in which the contactable state with the composition ML in the flattening apparatus R is achieved after a time of the expected interval.

Therefore, after the start of the applying of the composition ML is awaited by a time of the expected time—(the target value+the first predetermined value C1) (for example, a state in which the substrate transport mechanism 204 can be used is achieved), the applying of the composition ML starts. Accordingly, even in the case illustrated in FIG. 6B, after the applying starts, the contacting for the composition ML in the flattening apparatus R can be performed at a timing at which the time of (the target value+the first predetermined value C1) has passed.

The waiting time of the start of the applying may be set to a time obtained by subtracting a given time from the expected interval in consideration of a case in which an exact time cannot be expected as the expected interval. In this case, when the state similar to FIG. 6A is achieved, the start of the contacting may be delayed similarly as in the case of FIG. 6A.

In the state of FIG. 6B, while waiting for an applying timing, a situation of the flattening system is changed and the expected value of the interval is also changed in some cases. Accordingly, in the present embodiment, in the case illustrated in FIG. 6B, the expected interval is calculated again sequentially and the determination is updated while waiting for the applying timing.

That is, in step S506, if it is determined that the expected value–the target value≥the third predetermined value C3, the process returns to step S501 and the expected interval is sequentially updated.

In step S504, as described in FIG. 6A, the composition ML starts to be applied immediately and start of the contacting in the flattening apparatus R is awaited for a time reaching the target interval. On the other hand, in step S505, as illustrated in FIG. 6B, the composition ML starts to be applied after waiting the above-described time, and the process proceeds until the contacting starts.

After each process of steps S504 and S505 ends, the contacting starts and the flow of FIG. 5 ends.

Here, steps S502 to S506 function as controlling (control unit). In the controlling, if a difference between the expected value and the target value of the interval is equal to or greater than a predetermined value, start of the applying of the composition is delayed. However, by changing at least one of the applying timing, the transport waiting time, the transport time, and the contact waiting time, the control may be performed such that a difference between an actual interval and the target value is less than the first predetermined value.

As described above, according to the present embodiment, in any case of FIGS. 6A and 6B, after the composition ML starts to be applied, the contacting can be performed at a timing at which the time of the target interval has passed.

The example in which the applying start timing or the contact start timing is controlled focusing on only the time of each process has been described above. However, the present invention is not limited thereto. For example, an influence of an environment of a place (the preparation station, the substrate transport mechanism, or the flattening apparatus) where the substrate passes and is placed on volatilization may also be taken into account.

For example, the applying start timing or a contacting start timing for the composition ML in the flattening apparatus R may be calculated in accordance with temperature, humidity, or air pressure of a place in which the substate is placed. Specifically, temperature, humidity, air pressure, or the like that is an environment of a place (the preparation station, the substrate transport mechanism, or the flattening apparatus) where the substate passes or is placed is measured regularly.

The degree of influence of a value of each environment on the volatilization is measured in advance. For the target interval, an average environment of the flattening system is assumed. However, when the expected interval is calculated, the expected interval is corrected based on a measured value of temperature, humidity, air pressure, or the like at that time and the degree of influence of the measured value. That is, the expected value is calculated based on at least one of temperature, humidity, or air pressure of a place through which the substate passes.

As described above, according to the flattening system and the flattening method in the present embodiment, it is possible to stabilize the thickness of the flattened film in the flattening process. The molding system according to the present embodiment can also be applied to an imprinting system without being limited to the flattening system, as described above.

That is, the molding unit according to the present embodiment is not limited to an imprinting unit that brings the flattened surface of the mold into contact with the composition on the substrate for molding and includes an imprinting unit that brings a pattern of a mold into contact with a composition on the substate for the molding.

The imprinting system is a system that forms a pattern of a mold on a substrate and performs a similar process as the flattening system. Specifically, after a composition is applied to the substrate, the composition is cured with the mold brought into contact with the substrate.

Thereafter, a pattern film is formed on the substrate by separating the mold from the substrate. In an imprinting system in which a unit that applies a composition, a unit that performs imprinting, and a unit that transports a substate are located at different positions, there is a problem similar to that of the above-described flattening system. By applying the present invention, it is possible to stabilize the thickness of the pattern film in the imprinting process.

Product Manufacturing Method

A product manufacturing method according to the present embodiment is appropriate for manufacturing a microdevice such as a semiconductor device or a product of an element or the like that has a minute structure.

A method of manufacturing a device (a semiconductor device, a magnetic storage medium, a liquid crystal display element, or the like) as a product will be described.

The manufacturing method may include transferring a pattern of a mold to a surface of a substate (a wafer, a glass plate, a film-shaped substrate, or the like) using a molding apparatus. Here, the transferring of the pattern of the mold may include flattening. The substate is not limited to a single base material and may have a multi-layered structure.

The manufacturing method may include forming a latent image pattern in a photosensitive agent applied to a substate using an exposure apparatus (exposing of the substate) and developing of the substrate on which the latent image pattern is formed in the forming.

The manufacturing method further includes processing the substate before or after the transferring of the pattern. For example, the processing can include removing of a remaining film of the pattern. The manufacturing method can include known steps such as etching of the substate using the pattern as a mask, cutting of a chip from the substate (dicing), disposing of the chip on a frame and electrically connecting the chip (bonding), and sealing of the chip with a resin (molding).

In this way, the product manufacturing method according to the present embodiment includes molding for bringing a mold into contact with a composition for molding and processing and processing for processing a substrate after the molding by the above-described molding system. The product manufacturing method according to the present embodiment is advantageous in at least one of performance, quality, productivity, and production cost of a product, compared to the related art.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the molding system or the like through a network or various storage media. Then, a computer (or a CPU, an MPU, or the like) of the molding system or the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-100835, filed on Jun. 20, 2023, which is hereby incorporated by reference herein in its entirety.

What is claimed is:

1. A molding system comprising:
a composition applying unit configured to apply a composition on a substrate;
a molding unit configured to perform a molding process by bringing a mold into contact with the composition;
a transport unit configured to transport the substrate between the composition applying unit and the molding unit;
a calculation unit configured to calculate an expected value of an interval time from the applying of the composition to start of the contact; and
a control unit configured to perform control such that a difference between an actual interval time and a target value of the interval time becomes less than a predetermined value by changing at least one of a timing of the applying, a transport waiting time, a transport time, and a contact waiting time in a case in which the difference between the expected value and the target value of the interval time is equal to or greater than the predetermined value.

2. The molding system according to claim 1, wherein the control unit delays start of the applying of the composition if the expected value is equal to or greater than the target value by a first predetermined value.

3. The molding system according to claim 2, wherein the control unit delays the start of the applying if the target value is equal to or greater than the expected value by a second predetermined value.

4. The molding system according to claim 3, wherein the second predetermined value is a value different from the first predetermined value.

5. The molding system according to claim 1, wherein the interval time is calculated based on at least one of an applying time, the transport waiting time, the transport time, and the contact waiting time.

6. The molding system according to claim 1, wherein at least one of the target value and the expected value is calculated based on at least one of an amount and disposition of the composition to be applied and an operation time result value of a liquid droplet supply unit.

7. The molding system according to claim 1, wherein the target value is calculated based on a past operation result.

8. The molding system according to claim 1, wherein the expected value is calculated based on an operation schedule of the transport unit.

9. The molding system according to claim 1, wherein the expected value is calculated based on a position of the molding unit.

10. The molding system according to claim 1, wherein the expected value is calculated based on an immediately previous operation time of the molding unit.

11. The molding system according to claim 1, wherein the expected value is calculated based on at least one of temperature, humidity, and air pressure of a place through which the substrate passes.

12. The molding system according to claim 1, wherein the molding unit includes an imprinting unit configured to bring a flattened surface of the mold into contact with the composition on the substrate.

13. The molding system according to claim 1, wherein the molding unit includes an imprinting unit configured to bring a pattern of the mold into contact with the composition on the substrate.

14. A molding method comprising:
applying a composition on a substrate;
performing a molding process by bringing a mold into contact with the composition;
transporting the substrate between the applying of the composition and the molding;
calculating an expected value of an interval time from the applying of the composition to start of the contact; and
performing control such that a difference between an actual interval time and a target value of the interval time becomes less than a predetermined value by changing at least one of a timing of the applying, a transport waiting time, a transport time, and a contact waiting time in a case in which the difference between the expected value and the target value of the interval time is equal to or greater than the predetermined value.

15. A product manufacturing method comprising:
applying a composition on a substrate;
performing a molding process by bringing a mold into contact with the composition;
transporting the substrate between the applying of the composition and the molding;
calculating an expected value of an interval time from the applying of the composition to start of the contact;
performing control such that a difference between an actual interval time and a target value of the interval time is less than a predetermined value by changing at least one of a timing of the applying, a transport waiting time, a transport time, and a contact waiting time if the difference between the expected value and the target value of the interval time is equal to or greater than the predetermined value; and
processing the substrate after the molding.

* * * * *